(12) United States Patent
Urbina et al.

(10) Patent No.: US 9,529,398 B2
(45) Date of Patent: Dec. 27, 2016

(54) MANAGING AND REVOKING POWER ALLOCATED THROUGH BUS INTERFACES

(71) Applicant: Apple Inc., Cupertino, CA (US)

(72) Inventors: Fernando A. Urbina, Colorado Springs, CO (US); J. Rhoads Hollowell, II, Lafayette, CO (US); Steven Lee, Fremont, CA (US); Steven J. Sfarzo, Los Gatos, CA (US); Paul M. Thompson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 493 days.

(21) Appl. No.: 13/629,385

(22) Filed: Sep. 27, 2012

(65) Prior Publication Data

US 2014/0075212 A1 Mar. 13, 2014

Related U.S. Application Data

(60) Provisional application No. 61/698,867, filed on Sep. 10, 2012.

(51) Int. Cl.
*G06F 1/26* (2006.01)
*G06F 1/32* (2006.01)
*G06F 1/00* (2006.01)

(52) U.S. Cl.
CPC .............. *G06F 1/26* (2013.01); *G06F 1/3206* (2013.01); *G06F 1/266* (2013.01)

(58) Field of Classification Search
CPC ......... G06F 1/26; G06F 1/3203; G06F 1/3206
USPC .......................................... 713/300
See application file for complete search history.

(56) References Cited

U.S. PATENT DOCUMENTS

| | | | |
|---|---|---|---|
| 7,996,690 | B2 | 8/2011 | Shetty |
| 2005/0210304 | A1 | 9/2005 | Hartung et al. |
| 2007/0300083 | A1* | 12/2007 | Goodrum et al. ............ 713/300 |
| 2009/0193276 | A1* | 7/2009 | Shetty et al. ................. 713/340 |
| 2009/0319808 | A1* | 12/2009 | Brundridge et al. ......... 713/300 |
| 2011/0264933 | A1* | 10/2011 | Forsythe ....................... 713/320 |
| 2012/0209442 | A1* | 8/2012 | Ree .............................. 700/295 |

FOREIGN PATENT DOCUMENTS

EP 2487969 A1 8/2012

\* cited by examiner

*Primary Examiner* — Robert Cassity
(74) *Attorney, Agent, or Firm* — Blank Rome LLP

(57) ABSTRACT

The disclosed embodiments provide a system that manages power allocated through a set of bus interfaces on a computer system. During operation, the system obtains a first request for revocable current beyond a reserved current for a first bus interface from the set of bus interfaces, wherein the request is associated with a first device connected to the first bus interface. Next, the system allocates the revocable current to the first bus interface from an extra-current budget for the set of bus interfaces. Upon detecting a connection of a second device that requires non-revocable current over the extra-current budget to a second bus interface from the set of bus interfaces, the system transmits a first notification to the first device to relinquish the revocable current. Finally, the system allocates the non-revocable current to the second device from the relinquished revocable current.

24 Claims, 5 Drawing Sheets ing power allocated through bus interfaces in computer systems. More specifically, the disclosed embodiments relate to techniques for managing and revoking power allocated through the bus interfaces based on the power requirements of a set of devices connected to the bus interfaces and an extra-current budget associated with the bus interfaces.

Related Art

Computer systems typically include bus interfaces that enable the connection of various peripheral devices to the computer systems and/or use of the peripheral devices by the computer systems. For example, a computer system such as a desktop computer, laptop computer, and/or display may include multiple Universal Serial Bus (USB) interfaces, which may be used to connect the computer system to non-volatile storage devices, optical disk drives, input/output (I/O) devices, network devices, printers, power adapters, portable electronic devices, and even other computer systems.

However, differences in the power requirements and/or preferences of the peripheral devices may result in the inefficient allocation of power to the peripheral devices through the bus interfaces and/or limited use of the peripheral devices. For example, the USB interfaces of a computer system may support both USB 2.0 and USB 3.0 devices, which require up to 500 mA and 900 mA of current to operate, respectively. The computer system may also provide extra current beyond that required by the USB specification to charge batteries and/or perform other high-powered functions in the USB devices without requiring external power supplies for the USB devices. To ensure that all USB devices connected to the computer system receive adequate power to function, the computer system may reserve 900 mA of current for each USB interface, even if one or more of the bus interfaces are used with USB 2.0 devices with lower power requirements. In turn, the computer system may be unable to provide the unused current from empty USB ports and/or the USB 2.0 devices to other USB devices that request additional current, thus limiting the ability of the other USB devices to charge quickly and/or perform the high-powered functions.

Hence, what is needed is a mechanism for efficiently managing and allocating power to devices through bus interfaces in a computer system.

SUMMARY

The disclosed embodiments provide a system that manages power allocated through a set of bus interfaces on a computer system. During operation, the system obtains a first request for revocable current beyond a reserved current for a first bus interface from the set of bus interfaces, wherein the request is associated with a first device connected to the first bus interface. Next, the system allocates the revocable current to the first bus interface from an extra-current budget for the set of bus interfaces. Upon detecting a connection of a second device that requires non-revocable current over the extra-current budget to a second bus interface from the set of bus interfaces, the system transmits a first notification to the first device to relinquish the revocable current. Finally, the system allocates the non-revocable current to the second device from the relinquished revocable current.

In some embodiments, the system also updates the extra-current budget based on the non-revocable current and the relinquished revocable current, and transmits a second notification to renegotiate the revocable current to the first device.

In some embodiments, the system also obtains a second request for the revocable current after the second notification is transmitted, and reallocates the revocable current to the first bus interface based on the updated extra-current budget.

In some embodiments, updating the extra-current budget based on the non-revocable current and the relinquished revocable current involves adding the relinquished revocable current to the extra-current budget, and subtracting the non-revocable current from the extra-current budget.

In some embodiments, the extra-current budget is based on at least one of a number of the bus interfaces, the reserved current, and a power-management mode associated with the computer system.

In some embodiments, the revocable current is further allocated to the first bus interface based on at least one of a maximum current for the first bus interface and a set of priorities associated with the first device and other devices connected to the set of bus interfaces.

In some embodiments, the non-revocable current is associated with at least one of a power requirement for the second device and a version of a specification for the set of bus interfaces.

In some embodiments, the reserved current is associated with at least one of a low-power mode associated with a specification for the set of bus interfaces, a high-power mode associated with the specification, and a version of the specification.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
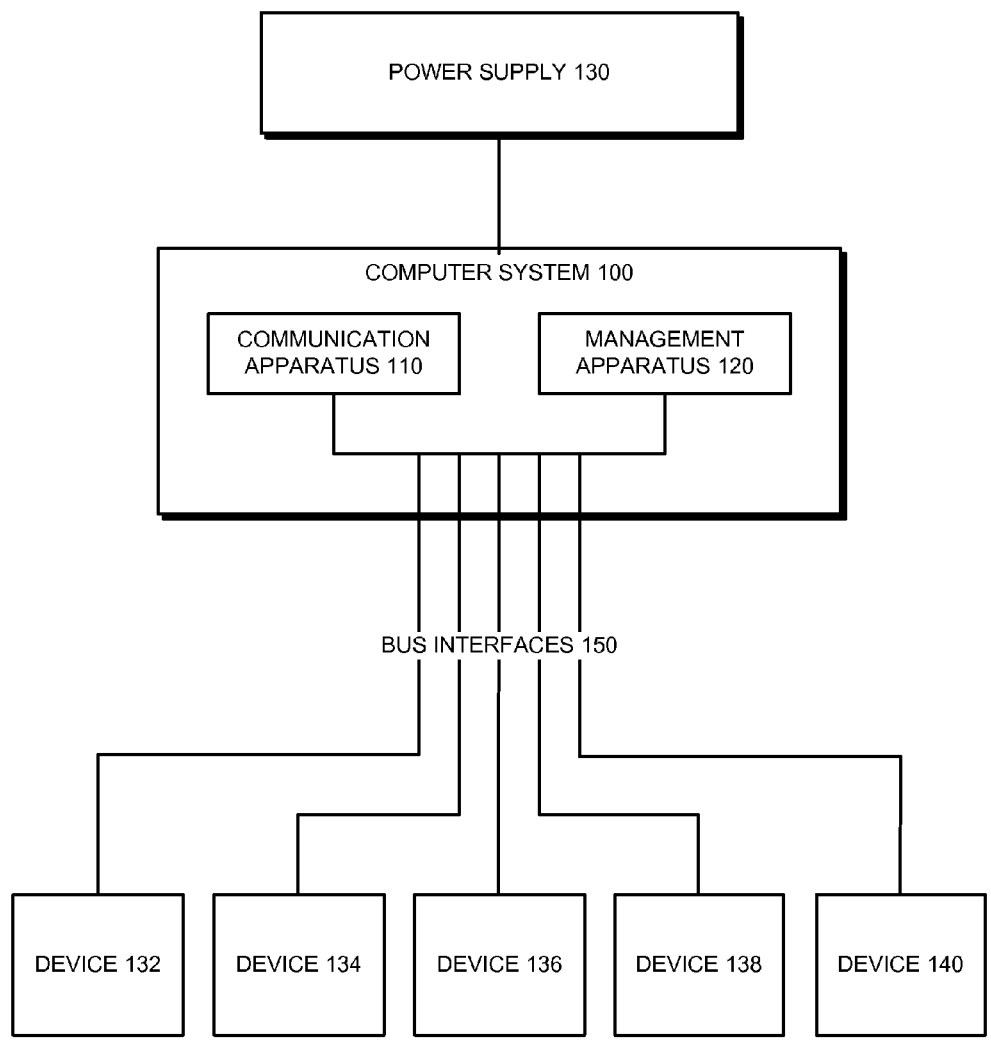
FIG. 1 shows a schematic of a system in accordance with the disclosed embodiments.

The disclosed embodiments provide a method and system for managing power allocated through a set of bus interfaces on a computer system such as a personal computer, laptop computer, workstation, and/or display. As shown in FIG. 1, a computer system 100 may be connected to a set of devices 132-140 through a number of bus interfaces 150. For example, computer system 100 may be connected to devices such as mice, keyboards, non-volatile storage devices, optical drives, and/or portable electronic devices through a set of Universal Serial Bus (USB) interfaces, FireWire (FireWire™ is a registered trademark of Apple Inc.) interfaces, Thunderbolt (Thunderbolt™ is a registered trademark of Apple Inc.) interfaces, and/or other types of bus interfaces.

Computer system 100 may also be connected to a power supply 130 that powers components in computer system 100 and/or devices 132-140 connected to bus interfaces 150. Once a device (e.g., device 132-140) is connected to a bus interface (e.g., bus interfaces 150) of computer system 100, the motherboard and/or another printed circuit board (PCB) of computer system 100 may route power from power supply 130 to the bus interface to enable operation of the device. For example, computer system 100 may supply power to an external hard disk drive (HDD) connected to a bus interface to enable the transmission of data between the external HDD and computer system 100. Computer system 100 may also use a bus interface to charge the battery of and/or power a mobile phone, portable media player, tablet computer, and/or other portable electronic device that is capable of both operating independently of computer system 100 and communicating with computer system 100.

Those skilled in the art will appreciate that different amounts of power may be allocated to devices (e.g., devices 132-140) connected to the same types of bus interface (e.g., bus interfaces 150). For example, a single USB interface may support both USB 2.0 devices, which initially use 100 mA of current and require up to 500 mA of current, and USB 3.0 devices, which initially use 150 mA of current and require up to 900 mA of current. Computer system 100 may also support the allocation of power beyond the maximum current required by the 2.0 and/or 3.0 versions of the USB specification. For example, computer system 100 may provide 1000 mA extra current over the 500 mA required by USB 2.0 to enable faster charging of a portable electronic device connected to the USB interface and/or the use of a high-powered device such as an external optical drive with the USB interface without a separate power supply.

However, the range of currents available to devices 132-140 connected to bus interfaces 150 may result in an inefficient allocation of power to devices 132-140 and/or bus interfaces 150. For example, computer system 100 may reserve 900 mA of current for each USB interface to ensure that all USB interfaces are capable of powering USB 3.0 devices, even if some USB interfaces are unused and/or connected to USB 2.0 devices that only use up to 500 mA of current. Furthermore, computer system 100 may be unable to divert the unused, reserved current to a device requesting additional current through a USB interface, thus precluding efficient use of the total current available through the USB interfaces by devices connected to the USB interfaces. Instead, computer system 100 may allocate the additional current from a limited amount of "extra" current over the reserved 900 mA for all bus interfaces to the device, which may prevent a second high-powered device connected to another USB interface from subsequently obtaining sufficient additional current over the reserved 900 mA to charge quickly and/or operate.

In one or more embodiments, computer system 100 includes functionality to manage and revoke power allocated to devices 132-140 through bus interfaces 150 based on the power requirements of devices 132-140 and an extra-current budget associated with bus interfaces 150. The extra-current budget may correspond to the current available to bus interfaces 150 over a reserved current for each bus interface from bus interfaces 150. For example, the extra-current budget for a set of USB interfaces may be calculated by subtracting a reserved number of unit loads multiplied by the number of USB interfaces from the total current provided to the USB interfaces by computer system 100 and/or power supply 130.

In addition, the reserved current for each bus interface may be lower than the amount of current required by the specification for bus interfaces 150. For example, the reserved current for a USB interface that supports both USB 2.0 and USB 3.0 may be lower than the 900-mA maximum required by the USB 3.0 specification. To increase use of the total current available to bus interfaces 150 while ensuring the operability of devices 132-140 connected to bus interfaces 150, computer system 100 may initially allocate unused current from the extra-current budget to a device requesting additional current and subsequently revoke the additional current if another device requires the current to operate, as discussed below.

To use current from the extra-current budget, a communication apparatus 110 in computer system 100 may request, for a device, revocable current beyond the reserved current for the bus interface to which the device is connected. The revocable current may be used by the device to perform non-critical functions. For example, the revocable current may be used to charge the device at a faster rate and/or enable the device to provide optional features to the user of computer system 100.

Alternatively, communication apparatus 110 may request non-revocable current beyond the reserved current if the device requires the additional current to operate. For example, the non-revocable current may be required by an optical disk drive to read an optical disk and/or a USB 3.0 device to perform high-powered bus functions.

A management apparatus 120 in computer system 100 may then allocate the requested current to bus interfaces 150 based on the nature of the request, the extra-current budget, the maximum current for each bus interface, and/or changes to the state of computer system 100 and/or devices 132-140. For example, management apparatus 120 may initially allocate a large amount of revocable current from the extra-current budget to a bus interface to facilitate faster charging of a tablet computer connected to the bus interface. However, management apparatus 120 may revoke the revocable current after an optical disk drive requiring non-revocable current over the remaining extra-current budget to operate is connected to another bus interface. Management apparatus 120 may also revoke the revocable current if computer system 100 transitions from a power-management mode associated with a higher extra-current budget (e.g., a wake mode) to a power-management mode associated with a lower extra-current budget (e.g., sleep mode, battery power, etc.), causing allocated extra current to devices 132-140 over the reserved current to exceed the extra-current budget. Finally, management apparatus 120 may allow devices 132-140 to re-request revocable current after the extra-current budget is lowered (e.g., after non-revocable current is allocated from the extra-current budget and/or computer system 100 transitions to a sleep mode). Allocation of revocable and non-revocable current from extra-current budgets is discussed in further detail below with respect to FIGS. 2-4.

By lowering the reserved current to below that required by some high-powered devices to operate, the system of FIG. 1 may allow other devices to temporarily "borrow" unused current from bus interfaces 150 for faster charging and/or high-powered optional operation of the other devices. The "borrowed" current may then be returned by the other devices to enable the operation of a high-powered device after the high-powered device is connected to a bus interface.

Those skilled in the art will appreciate that the system of FIG. 1 may be implemented in a variety of ways. More specifically, communication apparatus 110 and management apparatus 120 may be provided by a combination of hardware and/or software components on computer system 100 and/or devices 132-140. For example, communication apparatus 110 may be provided by a driver for one or more devices 132-140, and management apparatus 120 may be implemented by an operating system kernel of computer system 100. In addition, communication apparatus 110 and management apparatus 120 may use a series of calls to an application-programming interface (API) to communicate with one another. Alternatively, portions of communication apparatus 110 and/or management apparatus 120 may be provided by devices 132-140 to allow devices 132-140 to negotiate among one another for current from the extra-current budget.

Figure 2:
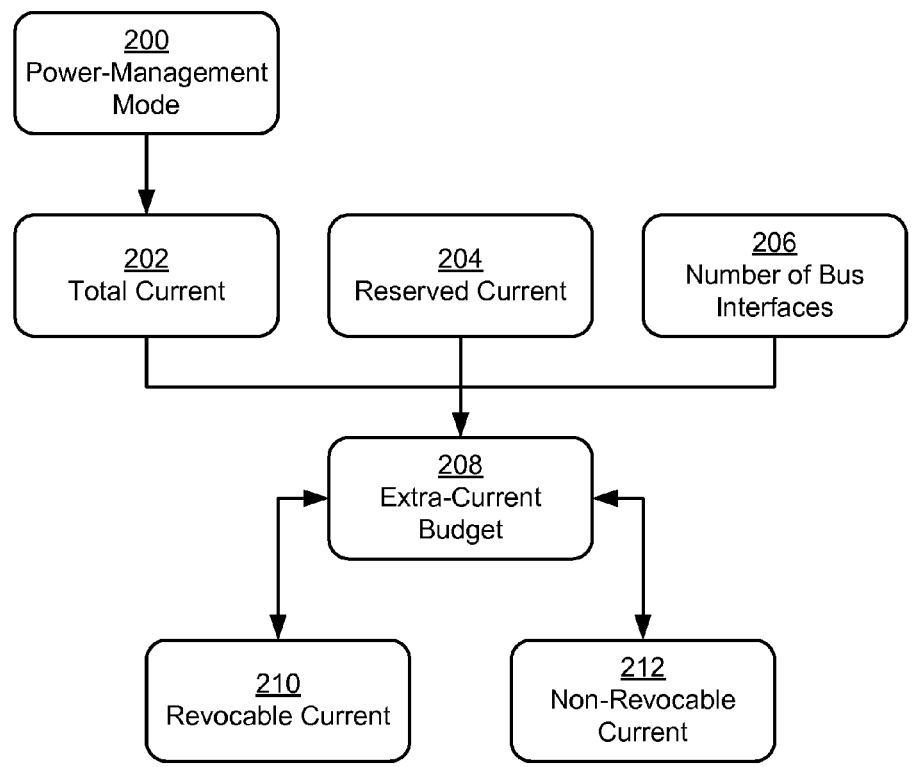
FIG. 2 shows the allocation of power to a set of bus interfaces in a computer system in accordance with the disclosed embodiments.

FIG. 2 shows the allocation of power to a set of bus interfaces (e.g., bus interfaces 150 of FIG. 1) in a computer system in accordance with the disclosed embodiments. As shown in FIG. 2, the computer system may be associated with a total current 202 for all of the bus interfaces, which may be affected by a power-management mode 200 of the computer system. For example, the computer system may have 2500 mA of total current 202 for use by the bus interfaces while the computer system is in a higher-powered wake mode and 1500 mA of total current 202 while the computer system is in a lower-powered sleep mode.

In addition, each bus interface may be associated with a reserved current 204 that ensures a minimum level of operation in a device (e.g., devices 132-140 of FIG. 1) connected to the bus interface. For example, reserved current 204 may be set to the current associated with a low-power mode for a USB 3.0 device (e.g., 150 mA) to allow the device to communicate with the computer system after the device is initially connected to the bus interface. Alternatively, reserved current 204 may be a higher, more conservative value, such as the maximum amount of current supported by a USB 2.0 interface (e.g., 500 mA).

Total current 202, reserved current 204, and a number of bus interfaces 206 in the computer system may influence an extra-current budget 208 for the bus interfaces. For example, extra-current budget 208 may be calculated by subtracting reserved current 204 multiplied by number of bus interfaces 206 from total current 202.

Extra-current budget 208 may then be used by the devices as revocable current 210 and/or non-revocable current 212 beyond reserved current 204. Revocable current 210 may be used by the devices to perform non-essential functions such as charging of batteries, while non-revocable current 212 may be required by the devices to operate. In addition, the allocation of revocable current 210 and non-revocable current 212 from extra-current budget 208 may reflect changes to the state of the computer system and/or the operation of the devices, as discussed in further detail below.

First, revocable current 210 may be allocated from extra-current budget 208 on a first-come, first-served basis, while non-revocable current 212 may take priority over revocable current 210. As a result, a device that requests and/or requires non-revocable current 212 over the available current in extra-current budget 208 may trigger the revocation of revocable current 210 allocated to other devices and the allocation of non-revocable current 212 from revocable current 210 relinquished by the other devices. For example, non-revocable current 212 may be allocated from relinquished revocable current 210 if a device requiring non-revocable current 212 is connected to a bus interface while extra-current budget 208 is below the required non-revocable current 212. Allocation of non-revocable current 212 from relinquished revocable current 210 may also occur in response to a change in power-management mode 200 from a wake mode to a sleep mode, which lowers extra-current budget 208 to below the existing allocation of revocable current 210 and/or non-revocable current 212 to devices already connected to the bus interfaces.

Second, the amount of revocable current 210 and/or non-revocable current 212 requested and/or required by a device may change based on the use of the device, which may result in changes to the allocation of revocable current 210 and/or non-revocable current 212 to other devices from extra-current budget 208. For example, a portable electronic device may voluntarily relinquish revocable current 210 used in charging of the portable electronic device after the portable electronic device has finished charging, thus increasing extra-current budget 208 without prompting from the computer system. Similarly, a high-powered keyboard may be connected to a USB interface with the computer system and provide additional USB interfaces to allow daisy chaining of USB devices from the USB interface. As a result, the keyboard may require a certain amount of non-revocable current 212 to operate if no devices are connected to the additional bus interfaces and a higher amount of non-revocable current 212 if one or more devices are connected to the additional bus interfaces. The connection of a device to an additional bus interface of the keyboard may cause the keyboard to request additional non-revocable current 212, which may be allocated from extra-current budget 208. If extra-current budget 208 cannot supply all of the additional non-revocable current 212, revocable current 210 may be revoked to increase extra-current budget 208 and enable the allocation of the additional non-revocable current 212 from extra-current budget 208. Conversely, the disconnection of the device from the additional bus interface may cause the keyboard to relinquish the additional non-revocable current 212, which may increase extra-current budget 208 for use in subsequent allocation of revocable current 210 and/or non-revocable current 212.

Finally, devices requesting revocable current 210 may be prioritized over one another. For example, a tablet computer may require more current than a mobile phone, portable media player, and/or smaller portable electronic device to charge effectively. As a result, a pre-specified amount of revocable current 210 (e.g., 500 mA) may be given to the tablet computer upon request, even if the current has to be diverted from revocable current 210 of another device with a lower priority.

Figure 3:
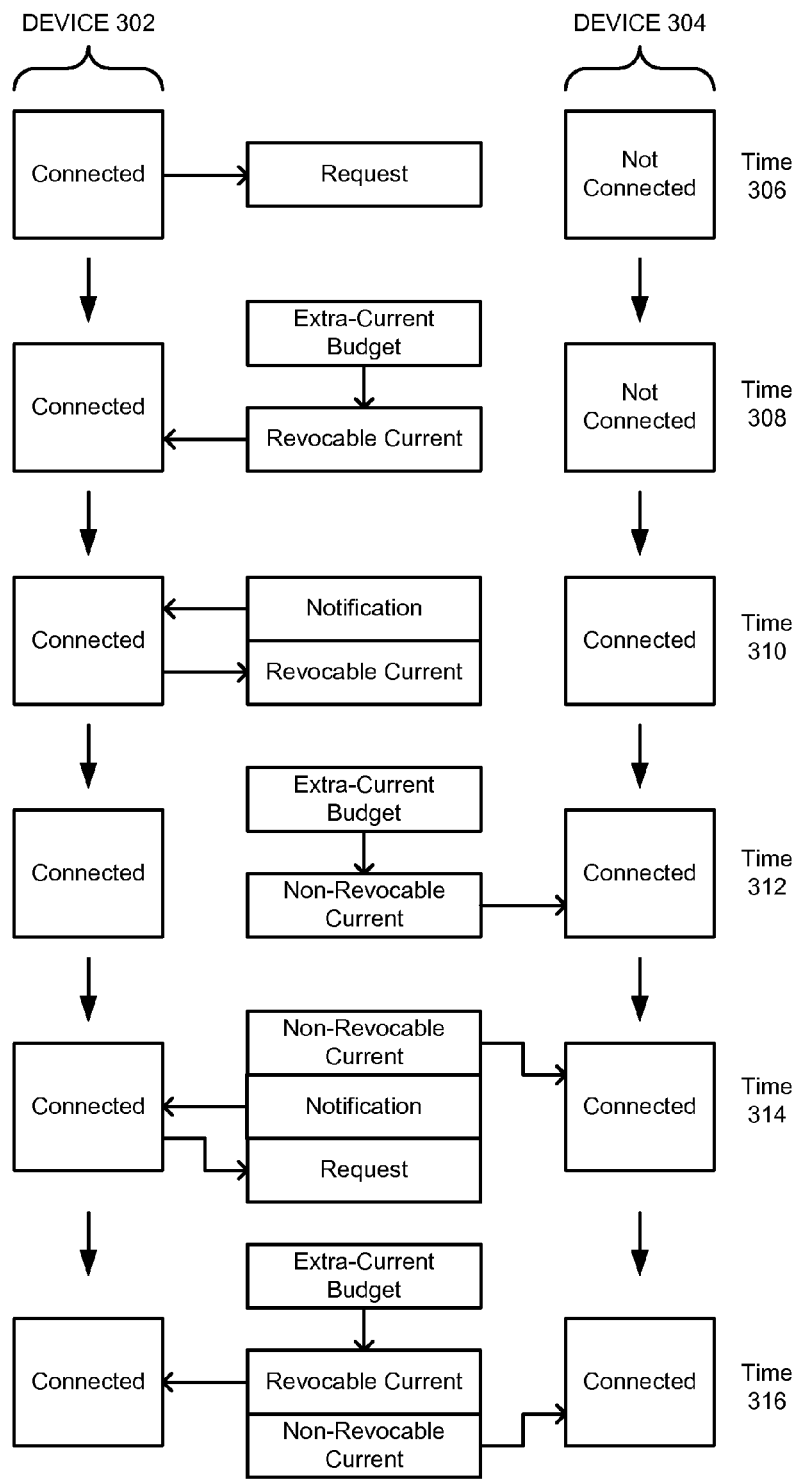
FIG. 3 shows an exemplary timeline of operations involved in managing power allocated to devices from bus interfaces of a computer system in accordance with the disclosed embodiments.

FIG. 3 shows an exemplary timeline of operations involved in managing power allocated to devices 302-304 from bus interfaces of a computer system in accordance with the disclosed embodiments. Devices 302-304 may be non-volatile storage devices, keyboards, mice, optical disk drives, portable electronic devices, and/or other devices with functionality to connect to bus interfaces such as USB interfaces, FireWire interfaces, and/or Thunderbolt interfaces.

Beginning with time 306, device 302 may be connected to a first bus interface of the computer system, and device 304 may not be connected to any bus interfaces of the computer system. In addition, device 302 and/or a communication apparatus (e.g., driver) associated with device 302 may transmit a first request for revocable current beyond a reserved current for the first bus interface. For example, device 302 may request revocable current beyond the 500-mA maximum current for operating a USB 2.0 device from a USB interface. In turn, device 302 may use the revocable current to charge a battery in device 302 and/or perform other non-essential high-powered operations.

At time 308, revocable current may be allocated to the first bus interface and/or device 302 from an extra-current budget for the bus interfaces. For example, the requested amount of revocable current may be allocated to device 302 if the revocable current does not exceed the extra-current budget and/or a maximum current for the first bus interface. If the requested revocable current exceeds the extra-current budget and/or the maximum current, the actual revocable current allocated to device 302 may be the lower of the extra-current budget and the maximum current.

At time 310, device 304 is connected to a second bus interface of the computer system, and the computer system may detect that device 304 requires non-revocable current beyond the extra-current budget. For example, device 304 may be a USB 3.0 device that requires 400 mA over the 500-mA reserved current for each of the bus interfaces in the computer system. However, the extra 400 mA cannot be met by the extra-current budget because most or all of the extra-current budget has already been allocated to device 302 and/or other devices connected to bus interfaces of the computer system. As a result, the computer system may transmit a first notification to device 302 and/or the other devices to relinquish the revocable current, and device 302 may give up the revocable current upon receiving the notification.

The relinquished revocable current may then be added to the extra-current budget and allocated as the non-revocable current to device 304 at time 312. At time 314, a second notification to renegotiate the revocable current is also transmitted to device 302, prompting a second request for the revocable current from device 302. For example, device 302 may ask for less revocable current at time 314 than at time 308 to accommodate the allocation of non-revocable current to device 304.

Finally, at time 316, the revocable current is reallocated to device 302 and/or the first bus interface from the extra-current budget. For example, the revocable current may be allocated to device 302 from the extra-current budget remaining after the non-revocable current is allocated to device 304 and/or revocable current is allocated in response to earlier requests for revocable current from the other devices. Alternatively, the revocable current may be allocated to device 302 regardless of the order in which the requests were received if device 302 is associated with a higher priority than the other devices.

Figure 4:
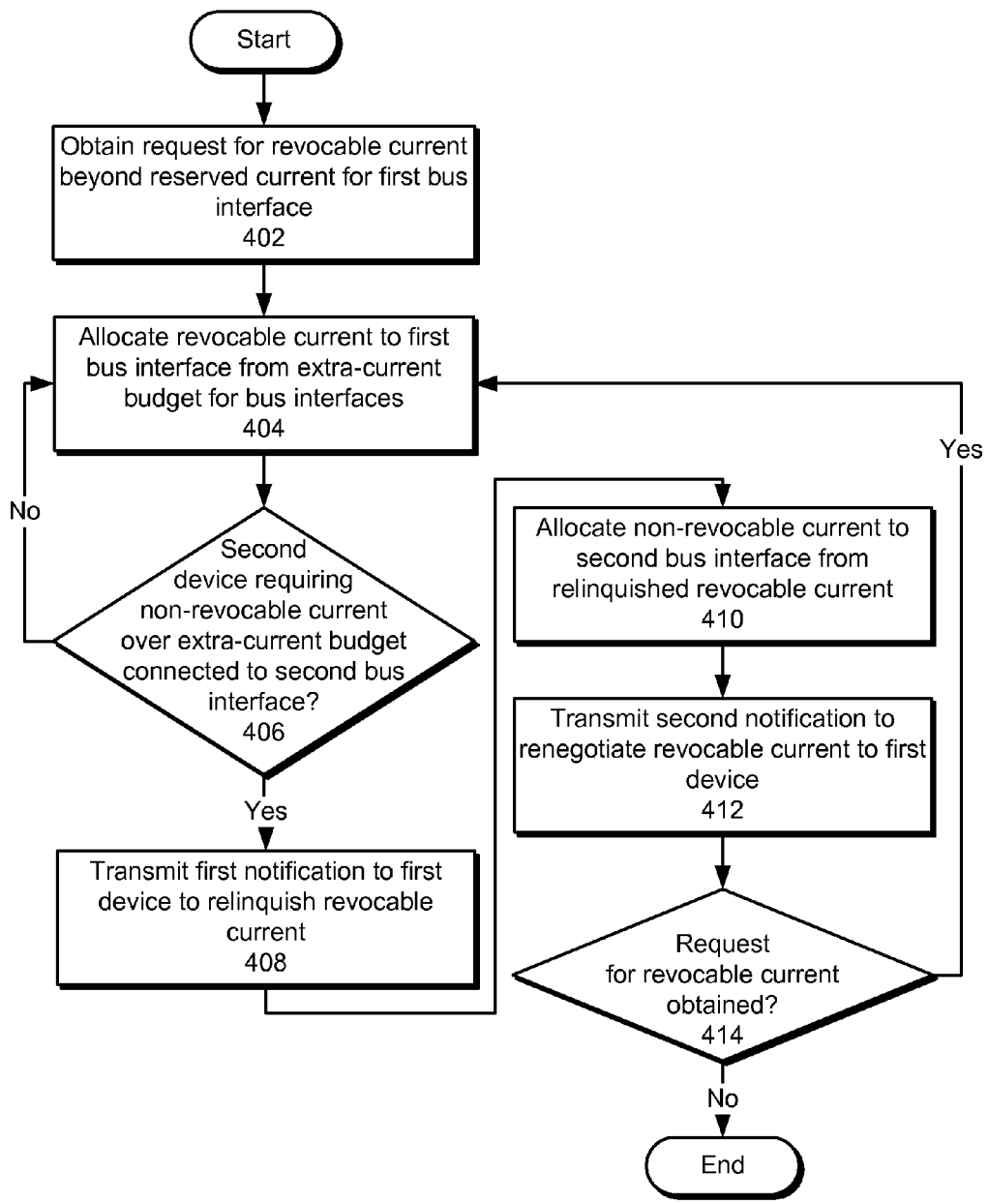
FIG. 4 shows a flowchart illustrating the process of managing power allocated through a set of bus interfaces in a computer system in accordance with the disclosed embodiments.

FIG. 4 shows a flowchart illustrating the process of managing power allocated through a set of bus interfaces in a computer system in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a request for revocable current beyond a reserved current for a first bus interface from the set of bus interfaces is obtained (operation 402). The request may be associated with a first device connected to the first bus interface, such as a portable electronic device, I/O device, and/or peripheral device. Next, revocable current may be allocated to the first bus interface from an extra-current budget for the bus interfaces (operation 404). For example, revocable current may be allocated to the first bus interface up to the requested amount of current, the extra-current budget, and/or a maximum current for the first bus interface. The revocable current may then be subtracted from the extra-current budget.

While the revocable current is provided to the first device through the first bus interface, a second device requiring non-revocable current over the extra-current budget may be connected to a second bus interface (operation 406) from the set of bus interfaces. For example, the second device may require non-revocable current over the extra-current budget if the second device is connected to the second bus interface while the extra-current budget is low or zero and/or the extra-current budget is lowered as a result of a change in the power-management mode of the computer system. If the second device is not connected to the second bus interface and/or does not require non-revocable current over the extra-current budget, the revocable current may continue to be allocated to the first bus interface from the extra-current budget (operation 404).

If non-revocable current over the extra-current budget is required by the second device, a first notification is transmitted to the first device to relinquish the revocable current (operation 408), and the non-revocable current is allocated to the second bus interface from the relinquished revocable current (operation 410). For example, the relinquished revocable current may be added to the extra-current budget, and the non-revocable current may be subtracted from the extra-current budget. The initial allocation of revocable current to the first bus interface may allow the first device to utilize unused current from the extra-current budget, while the subsequent relinquishing of the revocable current and allocation of the non-revocable current from the relinquished revocable current may allow the second device to operate while connected to the second bus interface.

A second notification to renegotiate the revocable current is also transmitted to the first device (operation 412), and an additional request for the revocable current may be obtained (operation 414) in response to the second notification. The additional request may be associated with a lower amount of revocable current than the first request to accommodate the allocation of non-revocable current to the second bus interface from the extra-current budget. If no additional requests for the revocable current are received, the revocable current is not allocated to the first bus interface. If an additional request for the revocable current is received, the revocable current is allocated to the first bus interface from the extra-current budget (operation 404), and non-revocable current is allocated to the second device and/or other devices connected to the bus interface from the extra-current budget and/or the revocable current (operations 406-412). Management of power allocated to the devices through the bus interfaces may continue until the devices are disconnected from the bus interfaces and/or the computer system is no longer used.

Figure 5:
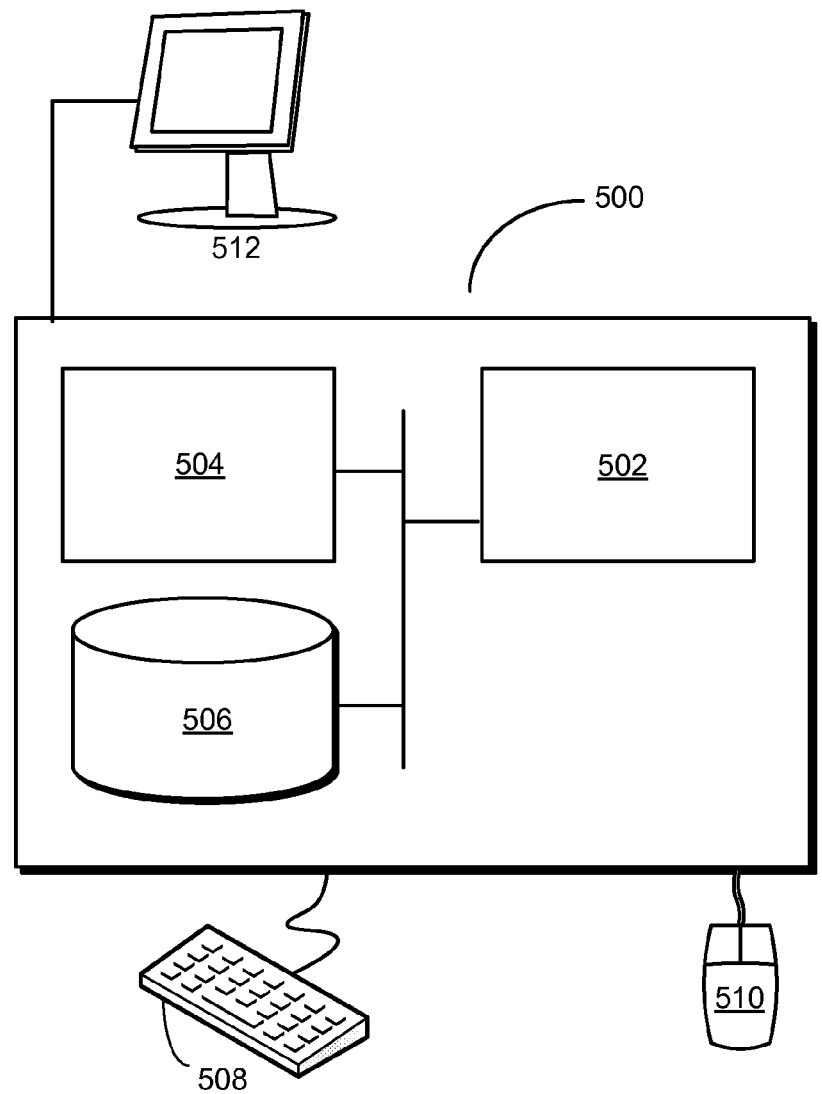
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for managing power allocated through a set of bus interfaces. The system may include a communication apparatus that generates, for a first device connected to a first bus interface from the set of bus interfaces, a first request for revocable current beyond a reserved current for the first bus interface. The system may also include a management apparatus that allocates the revocable current to the first bus interface from an extra-current budget for the set of bus interfaces. Next, the management apparatus may transmit a first notification to the first device to relinquish the revocable current upon detecting a connection of a second device that requires non-revocable current over the extra-current budget to a second bus interface from the set of bus interfaces. The management apparatus may then allocate the non-revocable current to the second device from the relinquished revocable current.

After the non-revocable current is allocated, the management apparatus may update the extra-current budget based on the non-revocable current and the relinquished revocable current and transmit a second notification to renegotiate the revocable current to the first device. The communication apparatus may then generate, for the first device, a second request for the revocable current after the second notification is transmitted, and the management apparatus may reallocate the revocable current to the first bus interface based on the updated extra-current budget.

In addition, one or more components of computer system 500 may be remotely located and connected to the other components over a network. Portions of the present embodiments (e.g., communication apparatus, management apparatus, etc.) may also be located on different nodes of a distributed system that implements the embodiments. For example, the present embodiments may be implemented using a cloud computing system that remotely manages and revokes power allocated to a set of remote devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for managing power allocated to peripheral devices through bus interfaces of a computer system, the method comprising:
while a computer system is in a first operating mode with an extra-current budget of a first value:
obtaining a first request for a revocable current from a first peripheral device, the first peripheral device connected to a first bus interface; and
allocating the revocable current based on the first request to the first peripheral device through the first bus interface from the extra-current budget; and
upon a transition of the computer system from the first operating mode to a second operating mode with the extra-current budget of a second value, wherein the second value of the extra-current budget is lower than the first value of the extra-current budget:
reducing the revocable current in accordance with a determination that the revocable current allocated to the first peripheral device exceeds the second value of the extra-current budget of the computer system;
wherein the extra-current budget corresponds to current available to the bus interfaces of the computer system exceeding current reserved for the bus interfaces of the computer system.

2. The method of claim 1, wherein reducing the revocable current allocated to the first peripheral device comprises transmitting a first notification to the first peripheral device to relinquish some or all of the revocable current allocated to the first peripheral device.

3. The method of claim 2, further comprising allocating the relinquished revocable current from the first peripheral device to one or more other peripheral devices of the peripheral devices.

4. The method of claim 2, further comprising:
transmitting a second notification to renegotiate the revocable current to the first peripheral device;

obtaining a second request for the revocable current from the first peripheral device; and reallocating the revocable current based on the second request to the first peripheral device through the first bus interface.

5. The method of claim 1, wherein the extra-current budget is based on at least one of:
a number of the bus interfaces;
the reserved current for the bus interfaces; and
a power-management mode associated with the computer system.

6. The method of claim 1, wherein the revocable current is allocated to the first peripheral device through the first bus interface based on at least one of:
a maximum current for the first bus interface; and
a set of priorities associated with the first peripheral device and other peripheral devices connected to the bus interfaces.

7. The method of claim 1, wherein upon detecting a connection of a second peripheral device that requires an additional non-revocable current over the extra-current budget through a second bus interface of the bus interfaces, further comprising:
transmitting a first notification to the first peripheral device to relinquish the revocable current; and
allocating the non-revocable current to the second peripheral device using the relinquished revocable current.

8. The method of claim 1, wherein the reserved current is associated with at least one of:
a low-power mode associated with a specification for the bus interfaces;
a high-power mode associated with the specification for the bus interfaces; and
a version of the specification.

9. A system for managing power allocated to a set of peripheral devices through a set of bus interfaces of a computer system, comprising:
a communication apparatus; and
a management apparatus;
wherein while a computer system is in a first operating mode with an extra-current budget of a first value:
the communication apparatus is configured to generate, for a first peripheral device connected to a first bus interface from the set of bus interfaces, a first request for a revocable current for the first bus interface; and
the management apparatus is configured to allocate the revocable current based on the first request to the first peripheral device through the first bus interface from the extra-current budget;
wherein upon a transition of the computer system from the first operating mode to a second operating mode with the extra-current budget of a second value, wherein the second value of the extra-current budget is lower than the first value of the extra-current budget, the management apparatus is configured to:
reduce the revocable current in accordance with a determination that the revocable current allocated to the first peripheral device exceeds the second value of the extra current budget of the computer system; and
wherein the extra-current budget corresponds to current available to the set of bus interfaces of the computer system exceeding current reserved for the set of bus interfaces of the computer system.

10. The system of claim 9, wherein while reducing the revocable current allocated to the first peripheral device, the communication apparatus is configured to transmit a first notification to the first peripheral device to relinquish some or all of the revocable current allocated to the first peripheral device.

11. The system of claim 10, wherein the management apparatus is further configured to allocate the relinquished revocable current from the first peripheral device to one or more other peripheral devices in the set of peripheral devices.

12. The system of claim 10, wherein the management apparatus is further configured to:
transmit a second notification to renegotiate the revocable current to the first peripheral device;
obtain a second request for the revocable current from the first peripheral device; and
reallocate the revocable current based on the second request to the first peripheral device through the first bus interface.

13. The system of claim 9, wherein the extra-current budget is based on at least one of:
a number of the set of bus interfaces;
the reserved current for the set of bus interfaces; and
a power-management mode associated with the computer system.

14. The system of claim 9, wherein the revocable current is allocated to the first peripheral device through the first bus interface based on at least one of:
a maximum current for the first bus interface; and
a set of priorities associated with the first peripheral device and other peripheral devices connected to the set of bus interfaces.

15. The system of claim 9, wherein upon detecting a connection of a second peripheral device that requires a non-revocable current over the extra-current budget through a second bus interface in the set of bus interfaces, the management apparatus is configured to:
transmit a first notification to the first peripheral device to relinquish the revocable current; and
allocate the non-revocable current to the second peripheral device using the relinquished revocable current.

16. The system of claim 9, wherein the reserved current is associated with at least one of:
a low-power mode associated with a specification for the set of bus interfaces;
a high-power mode associated with the specification for the set of bus interfaces; and
a version of the specification.

17. A non-transitory computer-readable storage medium storing instructions that, when executed by a computer system, cause the computer system to:
while a computer system is in a first operating mode with an extra-current budget of a first value:
obtain a first request for a revocable current from a first peripheral device, the first peripheral device connected to a first bus interface in the set of bus interfaces; and
allocate the revocable current based on the first request to the first peripheral device through the first bus interface from the extra-current budget; and
upon a transition of the computer system from the first operating mode to a second operating mode with the extra-current budget of a second value, wherein the second value of the extra-current budget is lower than the first value of the extra-current budget:
reduce the revocable current in accordance with a determination that the revocable current allocated to the first peripheral device exceeds the lower value of the extra-current budget of the computer system;

wherein the extra-current budget corresponds to current available to the bus interfaces of the computer system exceeding current reserved for the bus interfaces of the computer system.

18. The non-transitory computer-readable storage medium of claim 17, wherein the instructions to reduce the revocable current allocated to the first peripheral device comprises instructions to transmit a first notification to the first peripheral device to relinquish some or all of the revocable current allocated to the first peripheral device.

19. The non-transitory computer-readable storage medium of claim 18, wherein the instructions further comprises instructions to allocate the relinquished revocable current from the first peripheral device to one or more other peripheral devices in the set of peripheral devices.

20. The non-transitory computer-readable storage medium of claim 18, where the instructions further comprises instructions to:
   transmit a second notification to renegotiate the revocable current to the first peripheral device;
   obtain a second request for the revocable current from the first peripheral device; and
   reallocate the revocable current based on the second request to the first peripheral device through the first bus interface.

21. The non-transitory computer-readable storage medium of claim 17, wherein the extra-current budget is based on at least one of:
   a number of the set of bus interfaces;
   the reserved current for the set of bus interfaces; and
   a power-management mode associated with the computer system.

22. The non-transitory computer-readable storage medium of claim 17, wherein the revocable current is allocated to the first peripheral device through the first bus interface based on at least one of:
   a maximum current for the first bus interface; and
   a set of priorities associated with the first peripheral device and other peripheral devices connected to the set of bus interfaces.

23. The non-transitory computer-readable storage medium of claim 17, wherein upon detecting a connection of a second peripheral device that requires a non-revocable current over the extra-current budget through a second bus interface in the set of bus interfaces, further comprises instructions to:
   transmit a first notification to the first peripheral device to relinquish the revocable current; and
   allocate the non-revocable current to the second peripheral device using the relinquished revocable current.

24. The non-transitory computer-readable storage medium of claim 17, wherein the reserved current is associated with at least one of:
   a low-power mode associated with a specification for the set of bus interfaces;
   a high-power mode associated with the specification for the set of bus interfaces; and
   a version of the specification.

* * * * *